US008302516B1

(12) United States Patent
Marlin

(10) Patent No.: US 8,302,516 B1
(45) Date of Patent: Nov. 6, 2012

(54) HOLE PUNCHING AND REINFORCING APPARATUS AND METHOD OF USE

(76) Inventor: Claudia Marlin, Miramar, FL (US)

( * ) Notice: Subject to any disclaimer, the term of this patent is extended or adjusted under 35 U.S.C. 154(b) by 258 days.

(21) Appl. No.: 12/804,807

(22) Filed: Jul. 29, 2010

(51) Int. Cl.
*B26D 5/00* (2006.01)
*B32B 37/12* (2006.01)
*B32B 38/04* (2006.01)

(52) U.S. Cl. .................. 83/13; 83/618; 83/633; 83/684; 83/698.91; 156/513; 156/250; 156/261

(58) Field of Classification Search .............. 83/13, 453, 83/467.1, 684, 687, 698.91, 618–620, 633, 83/681; 156/256, 513–515, 250, 261, 556, 156/563, 564, 573, 530, 251
See application file for complete search history.

(56) References Cited

U.S. PATENT DOCUMENTS 1,800,460 A * 4/1931 MacLean ...................... 156/564
4,746,394 A * 5/1988 Sueta et al. .................. 156/513
4,909,893 A * 3/1990 Lee ............................... 156/513
6,206,070 B1 * 3/2001 Salmon ......................... 156/513
6,789,593 B1 * 9/2004 Aono et al. .................. 156/513
7,641,754 B1 * 1/2010 Hui ............................... 156/256
2007/0031073 A1 * 2/2007 Kato et al. ...................... 384/99
2008/0314526 A1 * 12/2008 Hui .............................. 156/510
2010/0247831 A1 * 9/2010 Okitsu et al. ................ 428/40.1

* cited by examiner

*Primary Examiner* — Phong Nguyen
(74) *Attorney, Agent, or Firm* — Frank L. Kubler

(57) ABSTRACT

An apparatus for punching at least one hole in a sheet of paper and attaching a reinforcing ring onto the sheet around the hole includes a platform; a hole punch rod mounted to and extending outwardly from the platform positioned to match a desired location for a hole on a sheet, the hole punch rod having a rod cutting end extending away from the platform; a sheet panel having a ring passing hole positioned to register with the longitudinal axis of the punch rod and sized to pass a reinforcing ring; a hole punch plate generally parallel to and spaced forwardly from the sheet panel and having a hole punching port positioned to register with the longitudinal axis of the hole punch rod, the hole punching port being sized to pass the rod cutting end closely enough to cut a hole into a sheet placed between the rod cutting end and the punching port; a sheet panel return spring mechanism.

15 Claims, 3 Drawing Sheets

HOLE PUNCHING AND REINFORCING APPARATUS AND METHOD OF USE

BACKGROUND OF THE INVENTION

1. Field of the Invention

The present invention relates generally to the field of paper binding devices. More specifically the present invention relates to an apparatus for punching at least one hole and preferably three holes in a sheet such as of paper and attaching a reinforcing ring onto the sheet around the hole, both in the same action.

The apparatus includes a platform and preferably three hole punch rods extending forwardly from the platform in spaced linear relation to each other matching desired hole spacing, each hole punch rod having a sharp rod edge, several coil return springs mounted extending forwardly and perpendicularly from the platform, a sheet panel resting on the coil return springs generally parallel to the platform and having ring passing holes, each positioned to register with the longitudinal axis of a corresponding punch rod and sized to pass a reinforcing ring, a hole punch plate positioned generally parallel to, spaced forwardly from and connected to the sheet panel and having hole punching ports, each positioned to register with the longitudinal axis of a corresponding punch rod and each sized to pass a rod cutting end closely enough to cut a hole into a sheet placed between the rod cutting ends and the corresponding punching ports, and panel advancing means for pressing the sheet panel and connected hole punch plate toward the platform a sufficient distance to pass the rod cutting ends through a sheet and the corresponding punching ports and along the punch rods toward the platform a sufficient distance to cause the sheet to contact a reinforcing ring fitted around each punch rod.

The platform and the sheet panel both preferably have rectangular outer peripheries. At least one of the coil return springs preferably encircles a punch rod and is sized in diameter to leave an annular gap between the punch rod and the given coil return spring large enough to receive a stack of reinforcing rings fitted around the punch rod. The sheet panel and punch plate preferably are a single piece of material connected at their adjacent edges by a bent connecting segment of the panel. The platform and sheet panel preferably are wider and longer than the sheet to be hole punched, and several guide rods substantially parallel to the punch rods and mounted such as at platform corners preferably are provided at the periphery of the platform beyond where sheet edges would be which pass through close fitting guide holes in the sheet panel periphery and are each encircled by a coil return spring. The guide rods preferably have threaded guide rod forward ends so that sheet panel anchoring wing nuts can be screwed onto the guide rod forward ends to hold the sheet panel in place. The panel advancing means preferably includes a lever structure mounted on a hinge connected to the platform and extending over the punch plate.

A method of operating the apparatus is also provided, in which the user moves the sheet panel and hole punch plate away from the punch rods, places a stack of reinforcing rings having adhesive on their forward faces over and around each punch rod, moves the sheet panel and connected punch plate so that the ring passing holes and hole punching ports again register with the corresponding punch rod axes, places a sheet to be hole punched onto the sheet panel and over the ring passing holes, uses the panel advancing means to press the sheet panel and punch plate and sheet toward the platform until the punch rods push the sheet against the punch plate and pass into the punching ports to cut holes into the sheet and also push the sheet into contact with the adhesive of the forwardmost reinforcing ring in each stack so that the forwardmost reinforcing ring adheres to the sheet rearward face around a hole cut just a moment before, and releases the panel advancing means so that the coil return springs push the sheet panel away from the platform and thus move the sheet upwardly and away from the stacks of rings so that the top rings separate from their respective stacks and remain on the sheet rearward face around cut holes, and the punch rods pass out of the cut holes. Then the sheet is removed from the sheet panel.

2. Description of the Prior Art

There have long been hole punchers for punching holes along edges of pieces of paper such as to mount the paper in a ring binder. A problem with such punched holes has been that paper tends to tear easily at the punched holes and as a result can become dislodged from a binder. To solve this problem, adhesive reinforcing rings of durable paper, plastic or cardboard have been developed for individually placing on the paper by hand around the holes. A problem has been that such individual placement of these rings around each hole is laborious, time consuming and tedious.

It is thus an object of the present invention to provide a hole punching and reinforcing apparatus which automatically deposits a reinforcing ring onto a sheet such as of paper around each punch hole while the sheet is being hole punched.

It is another object of the present invention to provide such an apparatus which deposits the reinforcing rings onto the sheet around each hole simultaneously during the hole punching action.

It is finally an object of the present invention to provide such an apparatus which is easy to use and which costs about the same as a conventional multiple hole puncher to manufacture.

SUMMARY OF THE INVENTION

The present invention accomplishes the above-stated objectives, as well as others, as may be determined by a fair reading and interpretation of the entire specification.

An apparatus for punching at least one hole in a sheet such as of paper and attaching a reinforcing ring onto the sheet around the hole is provided, including a platform; a hole punch rod mounted to and extending outwardly from the platform positioned to match a desired location for a hole on a sheet, the hole punch rod having a rod cutting end extending away from the platform; a sheet panel having a ring passing hole positioned to register with the longitudinal axis of the punch rod and sized to pass a reinforcing ring; a hole punch plate generally parallel to and spaced forwardly from the sheet panel and having a hole punching port positioned to register with the longitudinal axis of the hole punch rod, the hole punching port being sized to pass the rod cutting end closely enough to cut a hole into a sheet placed between the rod cutting end and the punching port; a return spring mechanism biasing the sheet panel and the hole punch plate forwardly from the platform; and panel advancing mechanism for advancing the sheet panel and the hole punch plate toward the platform against biasing of the return spring mechanism a sufficient distance to pass the rod cutting end through a sheet between the rod cutting end and the punching port and through the punching port and along the punch rod toward the platform a sufficient distance to cause the sheet to contact a reinforcing ring fitted around the punch rod.

The return spring mechanism preferably includes a coil return spring extending forwardly from the platform and against which the sheet panel rests. The apparatus preferably includes several the coil return springs.

An apparatus for punching several holes in a sheet such as of paper and attaching a reinforcing ring onto the sheet around each hole, including a platform; several hole punch rods mounted to and extending outwardly from the platform in spaced relation matching a desired hole spacing on a sheet, each hole punch rod having a rod cutting end extending away from the platform; a sheet panel having ring passing holes positioned to register with the longitudinal axis of corresponding the punch rods and sized to pass a reinforcing ring; a hole punch plate generally parallel to and spaced forwardly from the sheet panel and having hole punching ports positioned to register with the longitudinal axis of corresponding the punch rods, each hole punching port being sized to pass a rod cutting end closely enough to cut a hole into a sheet placed between the rod cutting ends and the corresponding the punching ports; a return spring mechanism biasing the sheet panel and the hole punch plate forwardly from the platform; and panel advancing mechanism for advancing the sheet panel and the hole punch plate toward the platform against the biasing of the return spring mechanism a sufficient distance to pass the rod cutting ends through a sheet between the rod cutting end and the punching port and through the corresponding the punching ports and along the punch rods toward the platform a sufficient distance to cause the sheet to contact a reinforcing ring fitted around each punch rod.

The return spring mechanism preferably includes a coil return spring extending forwardly from the platform and against which the sheet panel rests. The apparatus preferably includes several the coil return springs. The apparatus preferably includes three punch rods for punching three holes in a sheet. The platform and the sheet panel preferably both have substantially rectangular outer peripheries. The at least one of the coil return springs preferably encircles a punch rod and is sized in diameter to leave an annular gap between the given the punch rod and the given the coil return spring large enough to receive a stack of reinforcing rings fitted around the given the punch rod. The sheet panel and the punch plate preferably are a single piece of sheet material connected at adjacent edges by a bent connecting segment of the panel.

The platform and the sheet panel preferably are wider and longer than a sheet to be hole punched to define a peripheral area, and several guide rods generally parallel to the punch rods and positioned are provided at the peripheral area of the platform beyond where edges of a sheet would be which pass through close fitting guide holes in the sheet panel peripheral area and at least one of which is encircled by a coil return spring.

The guide rods preferably have threaded guide rod forward ends, and the apparatus preferably further includes sheet panel anchoring wing nuts for screwing onto corresponding guide rod forward ends to removably fasten the sheet panel; so that the wing nuts are removed and the sheet panel and connected punch plate can be lifted off the guide rods and the punch rods, and a stack of reinforcing rings can be placed around each punch rod, and then the sheet panel and the punch plate can be again placed over the platform and the guide rods and the punch rods pass through their respective guide holes and the hole punching ports, and the wing nuts are screwed onto the guide rod forward ends to again fasten the sheet panel to the platform.

The panel advancing mechanism preferably includes a lever structure mounted on a hinge connected to the platform and extending over one of the punch plate and the sheet panel, the lever structure having a contact protrusion extending from the lever structure for bearing against one of the punch plate and the sheet panel and a lever segment extending from the contact protrusion and away from the hinge.

The reinforcing rings preferably have an adhesion preventing material on their rearward faces so that they adhere to a sheet but not to each other to permit a top reinforcing ring to separate and lift away from a stack of reinforcing rings when adhering to a sheet.

A method of punching at least one hole in a sheet and attaching a reinforcing ring onto the sheet around the hole using an apparatus as described above; including the steps of: moving the sheet panel and hole punch plate away from the punch rods; placing a stack of reinforcing rings having adhesive on their upward sides over and around each punch rod; moving the sheet panel and connected punch plate so that the ring passing holes and hole punching ports again register with the corresponding punch rod axes; placing a sheet to be hole punched onto the sheet panel and over the ring passing holes; using the panel advancing mechanism to press the sheet panel and punch plate and sheet toward the platform until the punch rods push the sheet against the punch plate and pass into the punching ports to cut holes into the sheet and push the sheet into contact with the adhesive of the forwardmost reinforcing ring in each stack so that the forwardmost reinforcing ring adheres to the sheet rearward face around a hole cut just a moment before; releasing the panel advancing mechanism so that the coil return springs push the sheet panel away from the platform and thus moving the sheet upwardly and away from the stacks of rings so that the top rings separate from their respective stacks and remain on the sheet rearward face, and the punch rods pass out of the cut holes; and removing the sheet from the sheet panel.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
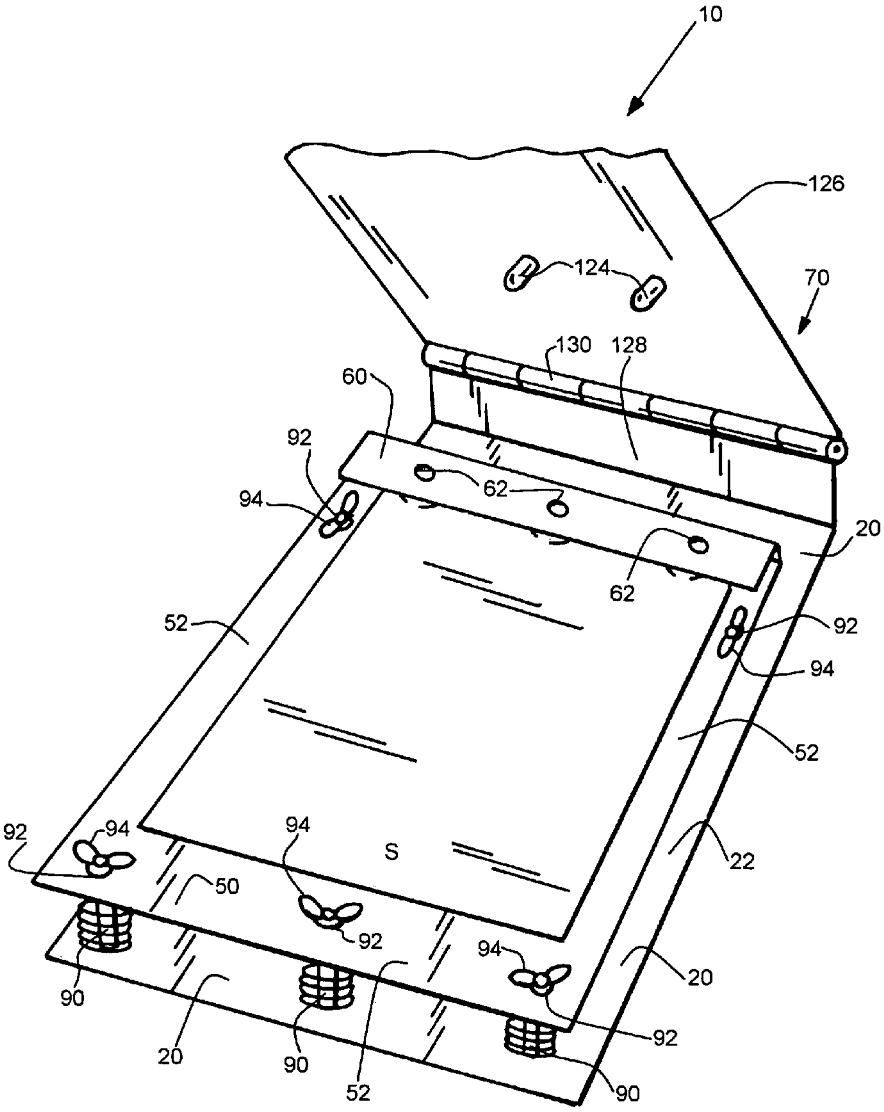
FIG. 1 is an upper perspective view of the preferred embodiment of the hole punching and reinforcing apparatus fitted with a sheet of paper to be hole punched.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2:
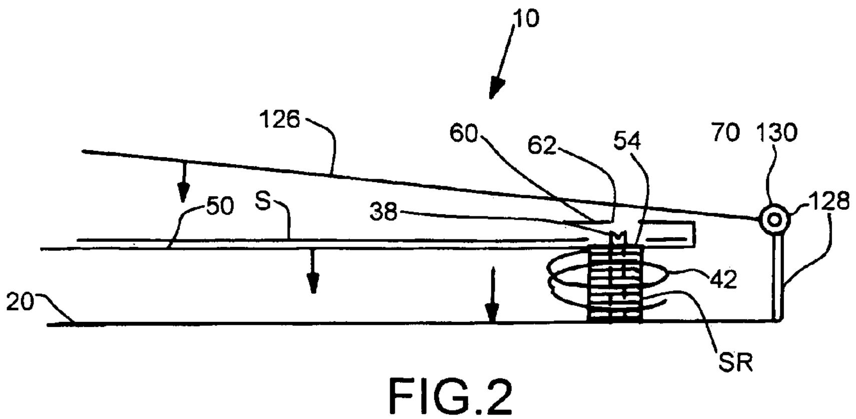
FIG. 2 is a side view of the apparatus of FIG. 1.
Figure 3:
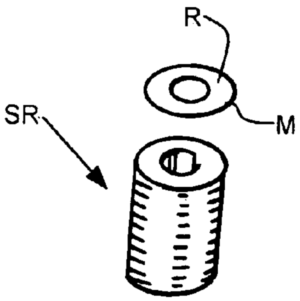
FIG. 3 is a perspective view of a stack of reinforcing rings.
Figure 4:
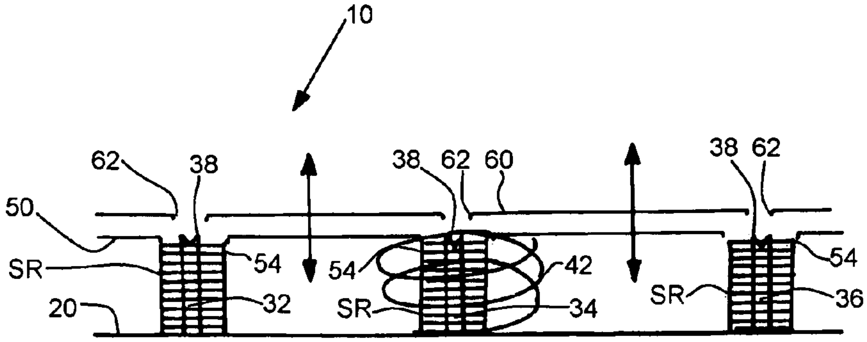
FIG. 4 is a front view of the apparatus of FIG. 1.
Figure 5:
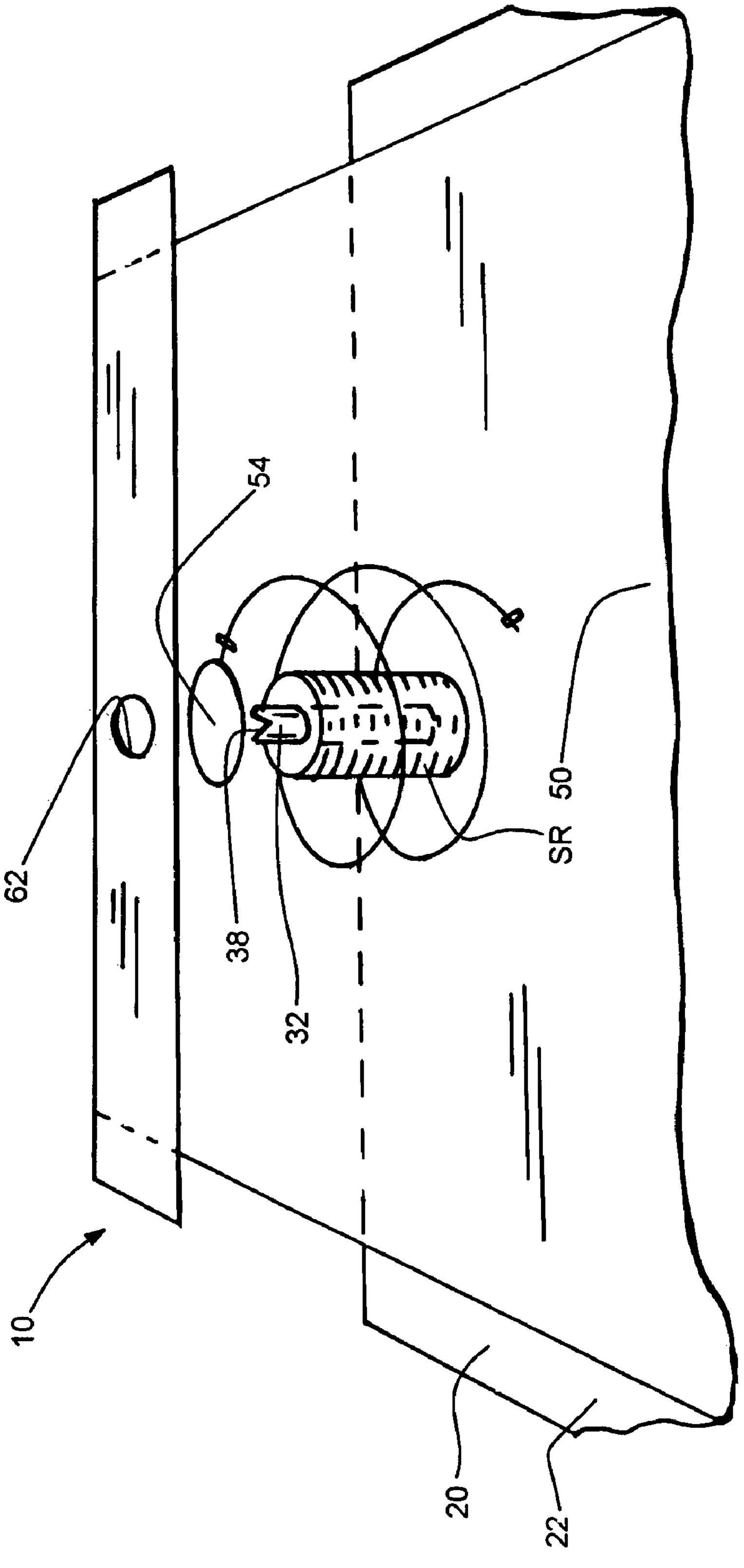
FIG. 5 is a partial upper perspective view of the apparatus of FIG. 1 with a section of the sheet panel broken away to reveal one of the punch rods and coil return spring.

Referring to FIGS. 1-5, an apparatus 10 is disclosed for punching at least one hole in a sheet S such as of paper and attaching a reinforcing ring R onto the sheet S around the hole, both in the same action. The apparatus 10 preferably punches three holes along an edge of a sheet S.

The apparatus 10 includes a platform 20 and preferably three hole punch rods 32, 34 and 36 extending forwardly from and preferably mounted perpendicularly to the platform 20 in spaced linear relation to each other matching desired hole spacing. Each hole punch rod 32, 34 and 36 has a sharp rod cutting edge 38, several coil return springs 42 mounted to extend forwardly from the platform 20. A sheet panel 50 rests on the coil return springs 42 generally parallel to the platform 20 and has ring passing holes 54, each positioned to register with the longitudinal axis of a corresponding punch rod 32, 34 or 36 and sized to pass a reinforcing ring R. The apparatus 10 further includes a hole punch plate 60 positioned generally parallel to, spaced forwardly from and connected to the sheet panel 50 and having hole punching ports 62 each positioned to register with the longitudinal axis of a corresponding punch rod 32, 34 or 36 and each sized to pass a rod cutting end 38 closely enough to cut a hole into a sheet S placed between the rod cutting ends 38 and the corresponding punching ports 62. Panel advancing means 70 is provided for pressing the sheet panel 50 and connected hole punch plate 60 toward the platform 20 a sufficient distance to pass the rod cutting ends 38 through a sheet S and the corresponding punching ports 62 and a along the punch rods 32, 34 and 36 toward the platform 20 a sufficient distance to cause the sheet S to contact a reinforcing ring R fitted around punch rods 32, 34 and 36.

The platform 20 and the sheet panel 50 both preferably have rectangular outer peripheries. At least one of the coil return springs 42 preferably encircles a punch rod 32, 34 or 36 and is sized in diameter to leave an annular gap G between the punch rod 32, 34 or 36 and the given coil return spring 42 large enough to receive a stack SR of reinforcing rings R fitted around the given punch rod 32, 34 or 36. The sheet panel 50 and punch plate 60 preferably are a single piece of material connected at their adjacent edges by a bent connecting segment 58 of the panel 50. The platform 20 and sheet panel 50 preferably are wider and longer than the sheet S to be hole punched to define a platform peripheral area 22 and a sheet panel peripheral area 52 or periphery beyond where sheet S edges would rest. Several guide rods 90 preferably are provided generally parallel to the punch rods 32, 34 and 36 and positioned such as at platform 20 corners in the platform peripheral area 22 of the platform 20 beyond where sheet S edges would be which pass through close fitting guide holes 54 in the sheet panel 50 peripheral area and are each encircled by a coil return spring 42. The guide rods 90 preferably have threaded guide rod forward ends 92 so that sheet panel anchoring wing nuts 94 can be removably screwed onto the guide rod forward ends 92 to hold the sheet panel 50 in place. To load apparatus 10 with reinforcing rings R, the wing nuts 94 are removed and the sheet panel 50 and connected punch plate 60 are lifted off the guide rods 90 and punch rods 32, 34 and 36, and a stack SR of reinforcing rings R is placed around each punch rod 32, 34 and 36. Then the sheet panel 50 and punch plate 60 are again placed over the platform 20 so that the guide rods 90 and punch rods 32, 34 and 36 pass through their respective guide holes 54 and hole punching ports 62 and sheet panel 50 again rests on coil springs 42, and the wing nuts 94 are screwed onto the guide rod forward ends 92.

The panel advancing means 70 preferably includes a lever structure 126 mounted on a hinge 130 connected to the platform 20 by a hinge flange 128 and extending over the punch plate 60. The lever structure 122 has a contact segment or contact protrusions 124 extending from the hinge 130 for bearing against the punch plate 60 or against the sheet panel 50 and has a lever segment 126 extending from the contact protrusions 124 and angled away from the sheet panel 50.

The reinforcing rings R have an adhesion preventing material M on their rearward faces such as a wax formulation or TEFLON™ so that they can adhere to a sheet S but not to each other to permit the top ring R to separate and individually lift away from its stack SR when adhering to a sheet S.

Method of Use

In practicing the invention, the following method may be used. To operate apparatus 10, the user moves the sheet panel 50 and hole punch plate 60 away from the punch rods 32, 34 and 36 as described above, places a stack SR of reinforcing rings R having adhesive on their forward faces over and around each punch rod 32, 34 and 36, moves the sheet panel 50 and connected punch plate 60 so that the ring passing holes 54 and hole punching ports 62 again register with the corresponding punch rod 32, 34 and 36 axes, places a sheet S to be hole punched onto the sheet panel 50 and over the ring passing holes 54, uses the panel advancing means 70 to press the sheet panel 50 and punch plate 60 and sheet S toward the platform 20 until the punch rods 32, 34 and 36 push the sheet S against the punch plate 60 and pass into the punching ports 62 to cut holes into the sheet S and also push the sheet S into contact with the adhesive of the forwardmost reinforcing ring R in each stack SR so that the forwardmost reinforcing ring R adheres to the sheet S rearward face around a hole cut just a moment before, and releases the panel advancing means 70 so that the coil return springs 42 push the sheet panel 50 away from the platform 20 and thus move the sheet S upwardly and away from the stacks SR of rings R so that the top rings R separate individually from their respective stacks SR and remain on the sheet S rearward face around cut holes, and the punch rods 32, 34 and 36 pass out of the cut holes. Then the sheet S is removed from the sheet panel 50.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. An apparatus for punching at least one hole in a sheet such as of paper and attaching a reinforcing ring onto the sheet around the hole, comprising:

a platform;

a hole punch rod mounted to and extending outwardly from said platform positioned to match a desired location for a hole on a sheet, said hole punch rod having a rod cutting end extending away from said platform;

a sheet panel having a ring passing hole positioned to register with the longitudinal axis of said punch rod and sized to pass a reinforcing ring;

a hole punch plate generally parallel to and spaced forwardly from said sheet panel and having a hole punching port positioned to register with the longitudinal axis of said hole punch rod, said hole punching port being sized to pass said rod cutting end closely enough to cut a hole into a sheet placed between said rod cutting end and said punching port;

return spring means biasing said sheet panel and said hole punch plate forwardly from said platform;

and panel advancing means for advancing said sheet panel and said hole punch plate toward said platform against biasing of said return spring means a sufficient distance to pass said rod cutting end through a sheet between said rod cutting end and said punching port and through said punching port and along said punch rod toward said platform a sufficient distance to cause the sheet to contact a reinforcing ring fitted around said punch rod.

2. The apparatus of claim 1, wherein said return spring means comprises a coil return spring extending forwardly from said platform and against which said sheet panel rests.

3. The apparatus of claim 2, comprising a plurality of said coil return springs.

4. An apparatus for punching a plurality of hole in a sheet such as of paper and attaching a reinforcing ring onto the sheet around each hole, comprising:

a platform;

a plurality of hole punch rods mounted to and extending outwardly from said platform in spaced relation matching a desired hole spacing on a sheet, each said hole punch rod having a rod cutting end extending away from said platform;

a sheet panel having ring passing holes positioned to register with the longitudinal axis of corresponding said punch rods and sized to pass a reinforcing ring;

a hole punch plate generally parallel to and spaced forwardly from said sheet panel and having hole punching ports positioned to register with the longitudinal axis of corresponding said punch rods, each said hole punching port being sized to pass a rod cutting end closely enough to cut a hole into a sheet placed between said rod cutting ends and the corresponding said punching ports;

return spring means biasing said sheet panel and said hole punch plate forwardly from said platform;

and panel advancing means for advancing said sheet panel and said hole punch plate toward said platform against the biasing of said return spring means a sufficient distance to pass said rod cutting ends through a sheet between said rod cutting end and said punching port and through the corresponding said punching ports and along said punch rods toward said platform a sufficient distance to cause the sheet to contact a reinforcing ring fitted around each said punch rod.

5. The apparatus of claim 4, wherein said return spring means comprises a coil return spring extending forwardly from said platform and against which said sheet panel rests.

6. The apparatus of claim 5, comprising a plurality of said coil return springs.

7. The apparatus of claim 6, wherein at least one of said coil return springs encircles a punch rod and is sized in diameter to leave an annular gap between the given said punch rod and the given said coil return spring large enough to receive a stack of reinforcing rings fitted around the given said punch rod.

8. The apparatus of claim 5, wherein said platform and said sheet panel are wider and longer than a sheet to be hole punched to define a peripheral area, and wherein a plurality of guide rods generally parallel to said punch rods and positioned are provided at the peripheral area of said platform beyond where edges of a sheet would be which pass through close fitting guide holes in said sheet panel peripheral area and at least one of which is encircled by a coil return spring.

9. The apparatus of claim 8, wherein said guide rods have threaded guide rod forward ends, further comprising sheet panel anchoring wing nuts for screwing onto corresponding said guide rod forward ends to removably fasten said sheet panel;

such that said wing nuts are removed and the sheet panel and connected punch plate can be lifted off said guide rods and said punch rods, and a stack of reinforcing rings can be placed around each said punch rod, and then said sheet panel and said punch plate can be again placed over said platform and said guide rods and said punch rods pass through their respective said guide holes and said hole punching ports, and said wing nuts are screwed onto said guide rod forward ends to again fasten said sheet panel to said platform.

10. The apparatus of claim 4, comprising three punch rods for punching three holes in a sheet.

11. The apparatus of claim 4, wherein said platform and said sheet panel both have substantially rectangular outer peripheries.

12. The apparatus of claim 4, wherein said sheet panel and said punch plate are a single piece of sheet material connected at adjacent edges by a bent connecting segment of said panel.

13. The apparatus of claim 4, wherein said panel advancing means comprises a lever structure mounted on a hinge connected to said platform and extending over one of said punch plate and said sheet panel, said lever structure having a contact protrusion extending from said lever structure for bearing against one of said punch plate and said sheet panel and a lever segment extending from said contact protrusion and away from said hinge.

14. The apparatus of claim 4, wherein the reinforcing rings have an adhesion preventing material on their rearward faces such that they adhere to a sheet but not to each other to permit a top said reinforcing ring to separate and lift away from a stack of said reinforcing rings when adhering to a sheet.

15. A method of punching at least one hole in a sheet and attaching a reinforcing ring onto the sheet around the hole using an apparatus comprising a platform; a hole punch rod mounted to and extending outwardly from the platform positioned to match a desired location for a hole on a sheet, the hole punch rod having a rod cutting end extending away from the platform; a sheet panel having a ring passing hole positioned to register with the longitudinal axis of the punch rod and sized to pass a reinforcing ring; a hole punch plate generally parallel to and spaced forwardly from the sheet panel and having a hole punching port positioned to register with the longitudinal axis of the hole punch rod, the hole punching port being sized to pass the rod cutting end closely enough to cut a hole into a sheet placed between the rod cutting end and the punching port; return spring means biasing the sheet panel and the hole punch plate forwardly from the platform; and panel advancing means for advancing the sheet panel and the hole punch plate toward the platform against biasing of the return spring means a sufficient distance to pass the rod cutting end through a sheet between the rod cutting end and the punching port and through the punching port and along the punch rod toward the platform a sufficient distance to cause the sheet to contact a reinforcing ring fitted around the punch rod, comprising the steps of:

moving the sheet panel and hole punch plate away from the punch rods;

placing a stack of reinforcing rings having adhesive on their upward sides over and around each punch rod;

moving the sheet panel and connected punch plate such that the ring passing holes and hole punching ports again register with the corresponding punch rod axes;

placing a sheet to be hole punched onto the sheet panel and over the ring passing holes;

using the panel advancing means to press the sheet panel and punch plate and sheet toward the platform until the punch rods push the sheet against the punch plate and pass into the punching ports to cut holes into the sheet and push the sheet into contact with the adhesive of the forwardmost reinforcing ring in each stack such that the forwardmost reinforcing ring adheres to the sheet rearward face around a hole cut just a moment before;

releasing the panel advancing means such that the coil return springs push the sheet panel away from the platform and thus moving the sheet upwardly and away from the stacks of rings such that the top rings separate from their respective stacks and remain on the sheet rearward face, and the punch rods pass out of the cut holes;

and removing the sheet from the sheet panel.

* * * * *